United States Patent
Kaufman et al.

[11] Patent Number: 6,048,634
[45] Date of Patent: *Apr. 11, 2000

[54] FUEL CELL USING WATER-SOLUBLE FUEL

[75] Inventors: Arthur Kaufman, West Orange; Peter L. Terry, Chatham, both of N.J.

[73] Assignee: H Power Corporation, Belleville, N.J.

[*] Notice: This patent is subject to a terminal disclaimer.

[21] Appl. No.: 09/039,878

[22] Filed: Mar. 16, 1998

Related U.S. Application Data

[63] Continuation-in-part of application No. 08/878,015, Jun. 18, 1997, Pat. No. 5,776,625.

[51] Int. Cl.[7] .............................. H01M 2/00; H01M 2/02
[52] U.S. Cl. ................................ 429/34; 429/38; 429/39
[58] Field of Search ................. 429/30, 31, 32, 429/33, 34, 38, 39, 26

[56] References Cited

U.S. PATENT DOCUMENTS

| 3,372,060 | 3/1968 | Platner . |
| 3,468,712 | 9/1969 | Gillespie . |
| 3,554,803 | 1/1971 | Poirier . |
| 3,573,102 | 3/1971 | Lane et al. . |
| 3,573,104 | 3/1971 | Snyder et al. . |
| 4,988,583 | 1/1991 | Watkins et al. . |
| 5,108,849 | 4/1992 | Watkins et al. . |
| 5,300,370 | 4/1994 | Washington et al. . |
| 5,759,712 | 6/1998 | Hockaday ................................ 429/30 |
| 5,776,625 | 7/1998 | Kaurman et al. ........................ 429/30 |

*Primary Examiner*—Kathryn Gorgos
*Assistant Examiner*—Wesley A. Nicolas
*Attorney, Agent, or Firm*—Salzman & Levy

[57] ABSTRACT

A reactant flow system for a proton exchange membrane (PEM) fuel cell stack using a water-soluble fuel is described. The flow system includes the use of single-pass or multi-pass, flow channels. A flow channel section having at least one adjacent channel section whose reactant flows in an opposite direction thereto. The system has respective reactant inlets that are effectively adjacent to reactant outlets of the adjacent channel section. Restrictions are used at the reactant inlets to assure substantially uniform reactant flow among all of the flow channels.

91 Claims, 5 Drawing Sheets

FUEL CELL USING WATER-SOLUBLE FUEL

This is a continuation-in-part of Ser. No. 08/878,015, filed Jun. 18, 1997 now U.S. Pat. No. 5,776,625.

FIELD OF THE INVENTION

The present invention relates to fuel cells, and more particularly to an improved proton exchange membrane (PEM) fuel cell that operates with optimum moisture by means of countercurrent flow of reactants, especially involving air in cathode flow-field channels

BACKGROUND OF THE INVENTION

Water management in proton exchange membrane (PEM) fuel cells has been a long standing problem. Proton exchange membrane fuel cells require certain humidity levels in their reactant streams to prevent dry-out of the electrolyte membrane or flooding of the cell, especially at the inlet and outlet of this device. These fuel cells must be able to maintain a high membrane ionic conductivity, or the cell performance will be seriously degraded. This necessitates that there be a high water content within the membrane. On the other hand, it is necessary that the build-up of liquid water not reach the stage whereby the cathode (typically air-handling) electrode and/or flow-field becomes flooded.

The present invention teaches how to alleviate flooding if a water-soluble fuel such as methanol is used to power the fuel cell. The current invention delivers reactant air via two or more flow channels in each cathode flow-field of a fuel cell stack, so that a flow channel in which air flows in a given direction is always adjacent to at least one, but generally two, flow channels, with air flowing in the opposite direction. This method allows moisture exchange between relatively wet and relatively dry adjacent cell regions. The amount of moisture exchange is, of course, dependent upon the respective moisture conditions of the air in the corresponding adjacent flow channels. The inlets and outlets of each fuel cell are maintained effectively adjacent to each other, as are the channels that connect to the inlets and outlets, respectively, to prevent the gases from becoming too water-laden. The channels of the fuel cell are designed with a serpentine (or other multi-pass) pattern, in one embodiment, so that a small number of adjacent inlet-outlet pairs can feed and collect reactant gases from the entire cell surface. Uniform artificial restrictions are provided at the inlets of each flow channel of every cell in order to obtain uniformity in air flow rate among all of the parallel flow channels throughout all cells of the fuel cell stack. This is accomplished by allowing the restrictions to dominate, and thereby render effectively uniform, the air flow resistances among the various flow channels.

DISCUSSION OF RELATED ART

In U.S. Pat. No. 4,988,583, issued to Watkins et al, a PEM fuel cell is illustrated, having a cathode flow-field comprising a single serpentine flow channel that allows liquid product water to be removed from the cell at suitably low air flow rates in the case of a gaseous fuel stream.

U.S. Pat. No. 5,108,849, issued to Watkins et al on Apr. 28, 1992, for FUEL CELL FLUID Flow PLATE, discloses a multiple parallel serpentine flow arrangement (more appropriate for larger cell areas) that utilizes single air inlet and outlet openings. However, neither U.S. Pat. Nos. 4,988,583 nor 5,108,849 deals with the issue of flooding of the air side of a cell utilizing a water-soluble liquid fuel stream. In addition, these systems fail to teach equalizing the flow among parallel channels, as is taught by the present invention.

In U.S. Pat. Nos. 3,468,712 and 5,300,370, dead-ended interdigitated inlet and outlet channels are depicted. These channels force the air to flow through porous carbon electrode backing paper in order to reach the outlet channels from the inlet channels.

None of the above-mentioned patents is concerned with the problem of flooding of the PEM cell due to the use of a water-soluble fuel.

In U.S. Pat. No. 3,573,102, issued to Lane et al on Mar. 30, 1971, for FUEL CELL GAS MANIFOLD SYSTEM, a fuel cell is disclosed having adjacent inlets and outlets similar to this invention. However, contrary to the present invention, there are featured separate U-shaped "chambers." This chamber arrangement is not suitable for a proton exchange membrane fuel cell, since it does not provide for the removal of liquid product water. The apparatus also fails to show how to equalize the flow in the channels and would require many more inlet-outlet pairings to collect an equivalent fraction of reactant gases as does the multi-pass arrangement of the present invention.

In U.S. Pat. No. 3,573,104, issued to Snyder et al on Mar. 30, 1971, for FUEL CELL UNIT WITH NOVEL FLUID CONFINING AND DIRECTING FEATURES, a fuel cell is illustrated having a serpentine channel arrangement similar to the present invention. However, this patent does not teach how to prevent the flooding of the air side of the cell as the flow of liquid water at the anode side of the cell impacts the cathode electrode and flow-field. The inlets and the outlets are non-adjacent, and the system fails to teach equalizing the flow among parallel channels, as is taught by the present invention.

In U.S. Pat. No. 3,554,803, issued to Poirier on Jan. 12, 1971, for FUEL CELL DESIGNED FOR EFFICIENT STACKING, a rudimentary system of serpentine channeling is shown. This system is not concerned with the aforementioned problem of flooding of the air side of the cell, nor does this patent teach the equalization of the air or gas flow.

In U.S. Pat. No. 3,372,060, issued to Platner on Mar. 5, 1968, for FLUID DISTRIBUTION MEANS, a fuel cell is illustrated that uses baffles to direct gas flow therein. However, this system is not concerned with flooding of the air side of the cell, nor does this patent provide for flow equalization.

SUMMARY OF THE INVENTION

In accordance with the present invention, there is provided a reactant flow system for a proton exchange membrane (PEM) fuel cell. The flow system includes the use of single-pass, or multi-pass flow channels in each cell of a fuel cell stack. Each flow channel section has one or two adjacent channel sections, whose air flows in an opposite direction thereto (counter-current flow). The system comprises respective air inlets that are effectively adjacent to air outlets of the adjacent channel sections. This ensures that dry regions can receive moisture from wet regions and vice-versa. Restrictions are used at the air inlets of all flow channels within the fuel cell stack, to assure uniform air flow among all of the channels. This is accomplished by allowing the restrictions to dominate, and thereby render effectively uniform, the air flow resistances among the various flow channels. The restrictions at the inlets can comprise baffling, constrictions, and other constraints known for this purpose. The adjacent channels, or channel sections are generally parallel to each other over a substantial portion of their length. The channels can be made concentric, substantially circular, or curvilinear with respect to each other in alternate embodiments, of the straight channel design.

The Proton Exchange Membrane (PEM) fuel cell stack comprises a plurality of cells, in which each cell of said PEM fuel cell stack comprises a positive cathode electrode at which oxygen reduction takes place, a negative anode electrode at which fuel is oxidized, a proton-exchange electrolyte membrane disposed between said positive cathode electrode and said negative anode electrode, and in which between each pair of adjacent cells there are a cathode flow-field for distributing oxygen to an adjacent cathode electrode, at a side of the adjacent cathode electrode opposite a side in contact with its corresponding proton-exchange electrolyte membrane, an anode flow-field for distributing fuel to an adjacent anode electrode, at a side of the adjacent anode electrode opposite a side in contact with its corresponding proton-exchange electrolyte membrane, and a separator layer disposed between the cathode flow-field and the anode flow-field, that serves to isolate the oxygen in the cathode flow-field from the fuel in the anode flow, the PEM fuel cell stack being configured to prevent said electrolyte membrane from drying out.

It is an object of this invention to provide an improved reactant flow system for a PEM fuel cell.

It is another object of the invention to provide a reactant flow system for a PEM fuel cell having improved distribution of water content within the air flow channels and among the various regions comprising the active area of the cell.

It is a further object of the invention to provide a reactant flow system of counter-current character for a PEM fuel cell stack.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the invention features an aqueous-liquid-fuel vs. air PEM fuel cell operating so that its reactant gases have a moderated distribution of water content throughout their gas flow channels and among the various regions comprising the active area of the cell. Proton exchange membrane (PEM) fuel cells require controlled water levels in their gas reactant streams to prevent flooding of the air side of the cell.

The present invention involves the use of a reactant air delivery scheme that provides for countercurrent flow of air in adjacent flow channels. Thus, an air inlet opening is located effectively adjacent to an air outlet opening, and vice-versa. The flow channels linking the respective inlet and outlet openings are laid out adjacent to each other over the entire length of the channels, thereby providing countercurrent flow of the adjacent air streams. This approach could involve just two channels covering the entire active area of the cell, or a multiplicity of air flow channels accomplishing the same countercurrent relationship of adjacent channels could be employed. In addition, the countercurrent scheme could be accomplished with the use of but one channel covering the entire active area of the cell.

The ambient reactant air traveling through a flow channel tends to enter in a relatively dry state, since even humid ambient air will have a relatively low relative humidity when it reaches the typically higher temperature at which a cell operates. As the air moves downstream, it is mixed with water vapor that is generated at the cathode catalyst sites as the product of the fuel cell reaction and is also impacted by water migrating across the electrolyte membrane from a circulating fuel-water mixture or the anode side of the membrane. This results in increasing air relative humidity.

Figure 1:
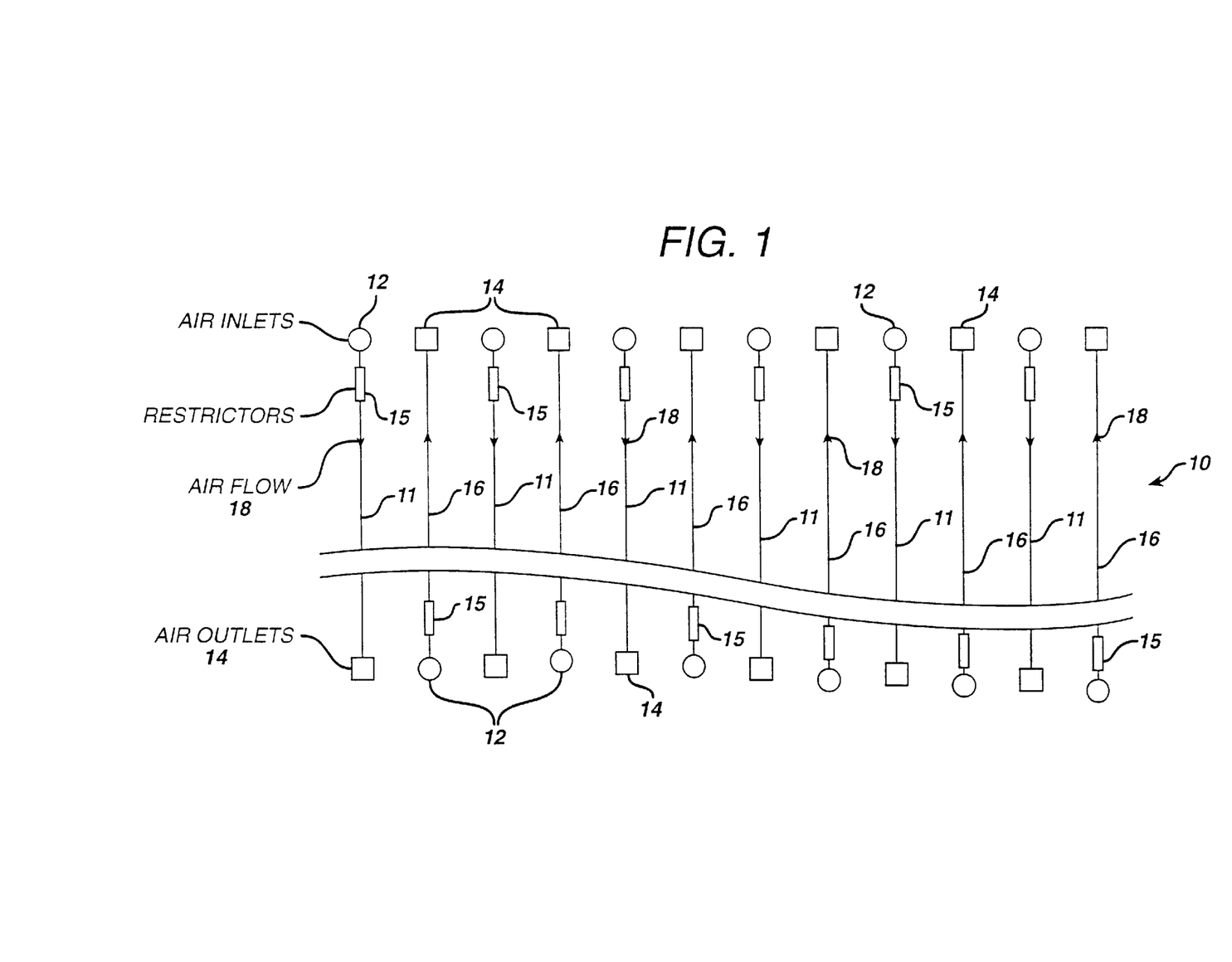
FIG. 1 illustrates a schematic view of a straight, multi-channel, parallel, single pass, reactant flow system.
Figure 1A:
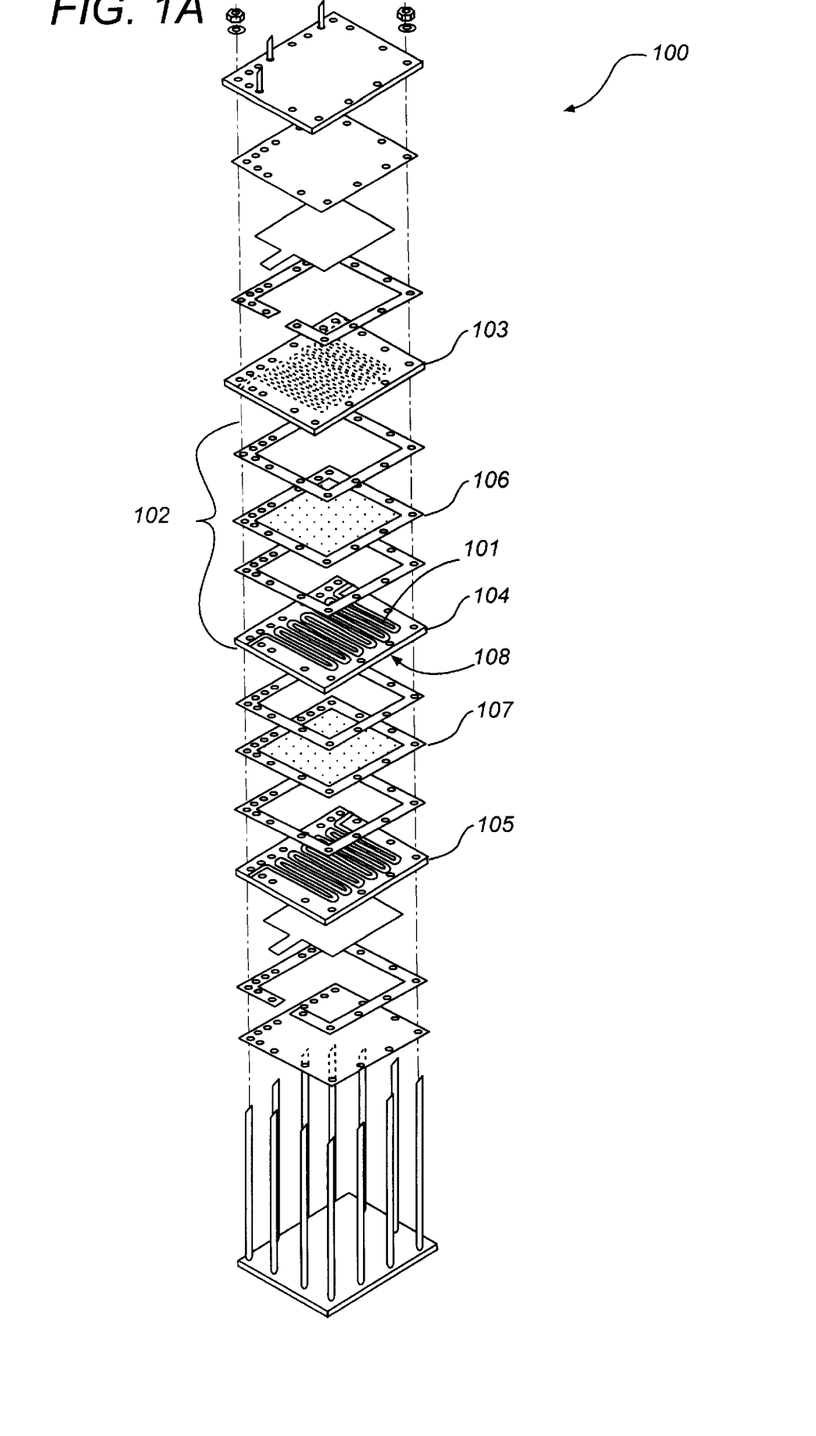
FIG. 1a shows a perspective exploded view of a PEM fuel cell stack with individualized components of the reactant flow system of this invention (restrictors not shown)

Now referring to FIG. 1a, a Proton Exchange Membrane (PEM) fuel cell stack 100, is shown in a perspective, exploded view. The fuel cell stack is comprised of a plurality of cells 102, comprised of repeating components, including membrane-electrode assemblies, each comprising an electrolyte membrane 106 and 107 about which a positive cathode electrode 103 and a negative anode electrode 105 are positioned; bipolar plates 104, each comprising an anode flow-field 101, a reactant-gas separator layer, and a cathode flow-field 108; and termination components. Oxygen reduction occurs at the positive cathode electrode 103. Fuel is oxidized at the negative anode electrode 105. A cathode flow-field 108 for distributing oxygen to an adjacent cathode electrode 103 is disposed at a side of the adjacent cathode electrode 103 that is opposite to the side in contact with its corresponding proton-exchange electrolyte membrane 107. Similarly, an anode flow-field 101 for distributing fuel to an adjacent anode electrode 105 is disposed at a side of the adjacent anode electrode 105 opposite a side in contact with its corresponding proton-exchange electrolyte membrane 106. The separator layer of the bipolar plate 104 separates the cathode flow-field 108 and the anode flow-field 101, and serves to isolate the oxygen in the cathode flow-field 108 from the fuel in the anode flow-field 101. The PEM fuel cell stack is configured to prevent the cathode side of said cells from flooding, as will be explained in more detail with reference to the subsequent FIGURES.

Figure 1B:
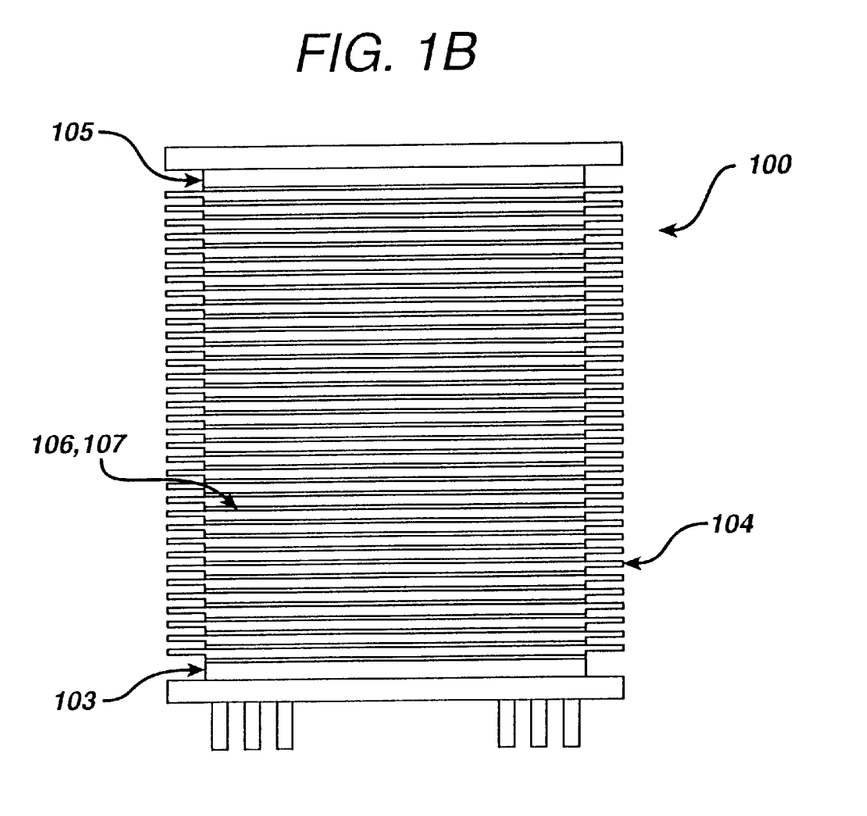
FIG. 1b depicts a front view of the assembled PEM fuel cell stack shown in FIG. 1.

Referring to FIG. 1b, the PEM fuel cell stack 100 is shown in its assembled state.

Referring to FIG. 1, the reactant flow system 10 is illustrated in accordance with this invention. The system 10 entails the use of alternating, parallel straight-through single channels 11 with adjacent, reactant air flow channels 16 carrying air in the opposite direction. The flow system 10 counteracts the tendency toward flooding in the regions of air stream near the outlets 14 of the air flow channels. This is accomplished via the migration of water, not shown, out of these regions toward the proximate inlet regions of the adjacent air flow channels, near the air inlets 12, where the air is relatively dry. The inlet sections 12 are in communication with the outlet sections 14 of the impacting, adjacent, reactant air flow channels 16, which carry an excess of water, as described above. The water migrates to the dry sections in directions that are perpendicular to the direction of air flow, the latter of which are illustrated by arrows 18. The water migrates through the cathode electrode, not shown, and through the electrolyte membrane itself, not shown.

The adjacent, reactant airflow channels 16 are closely spaced, being between approximately 0.1 and 0.2 cm apart, extremity to extremity. Therefore, the distances over which the water must migrate are rather short. Thus, the flow scheme 10 serves to substantially reduce the flooding of the cell. The system 10 provides efficient, stable operation in all regions of the cell.

The reactant flow system 10 of this invention might require that additional means be taken to assure reasonably uniform distribution of reactant air among the many parallel flow channels 11 and 16 within the cell illustrated, as well as among all of the cells of the stack. Artificial restrictions 15 at the inlet 12 of each flow channel 11 and 16, respectively, dominate the total resistance to air/water flow through the respective flow channels. This encourages uniform flow through the parallel flow channels by muting the effects of random changes in flow resistance within the various channels.

Figure 2:
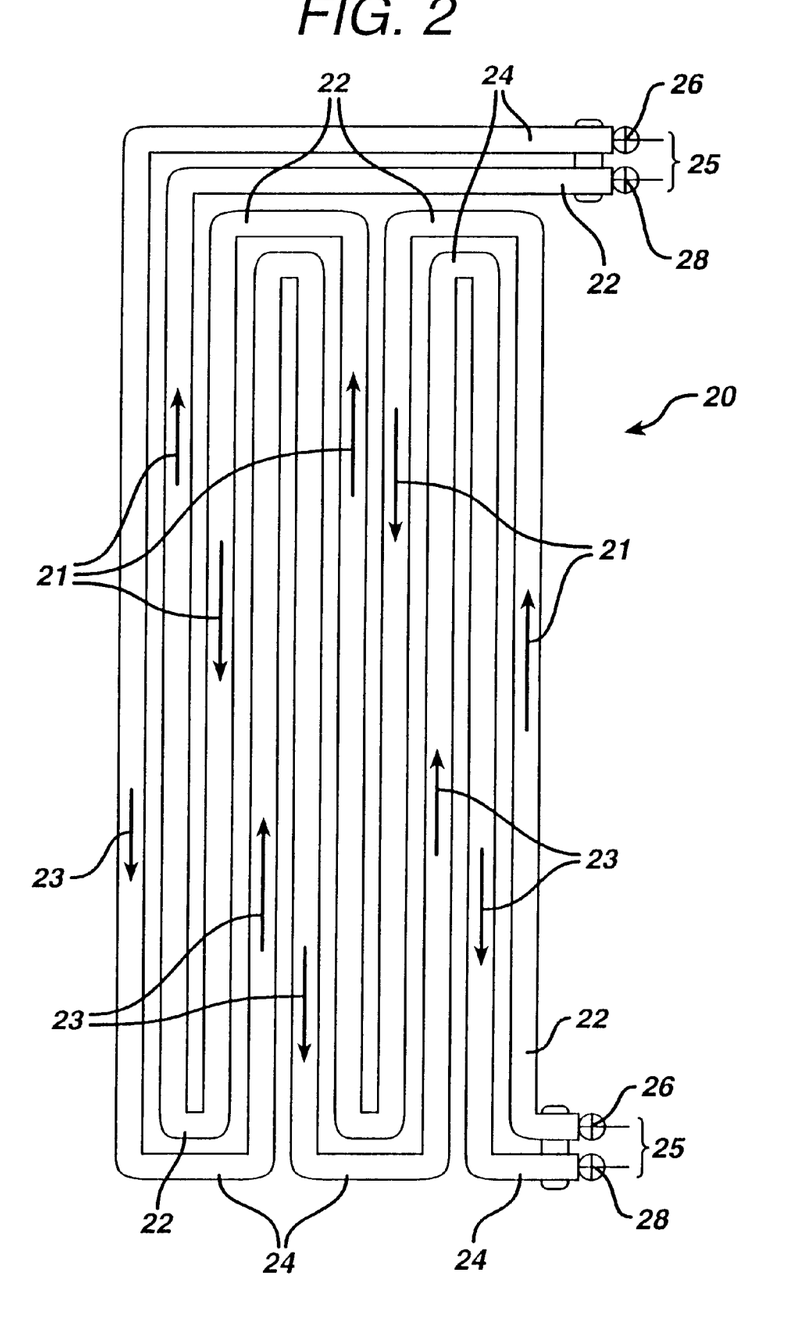
FIG. 2 shows a schematic view of an alternate embodiment of the reactant flow system of FIG. 1, in accordance with the PEM fuel cell stack shown in FIGS. 1a and 1b, wherein the system comprises a single pair of serpentine channels.

Referring now also to FIG. 2, an alternate embodiment 20 to the reactant flow system 10 of FIG. 1 is shown for the PEM fuel cell stack 100 of FIGS. 1a and 1b. The flow system 20 includes the use of pairs (one pair in this case, but possibly two pairs or more, in general) of serpentine, or other multi-pass, flow channels 22 and adjacent channels 24 having reactant air flow in opposite directions, as shown by arrows 21 and 23, respectively. The system 20 utilizes, for the purposes of clarity, only one pair of air flow channels, depicted by brackets 25. The respective air inlets 26 are adjacent to the air outlets 28 of the adjacent channels 22 and 24, respectively. Restrictions, not shown, are used at the air inlets 26, to assure uniform air flow between the two adjacent channels 22 and 24, respectively, or among all of the channels, if more than one pair is used, and among all of the channels in the cells of the fuel cell stack, not shown. The air flow restrictions can comprise baffling, constrictions, and other flow constraints known in the art.

Figure 3:
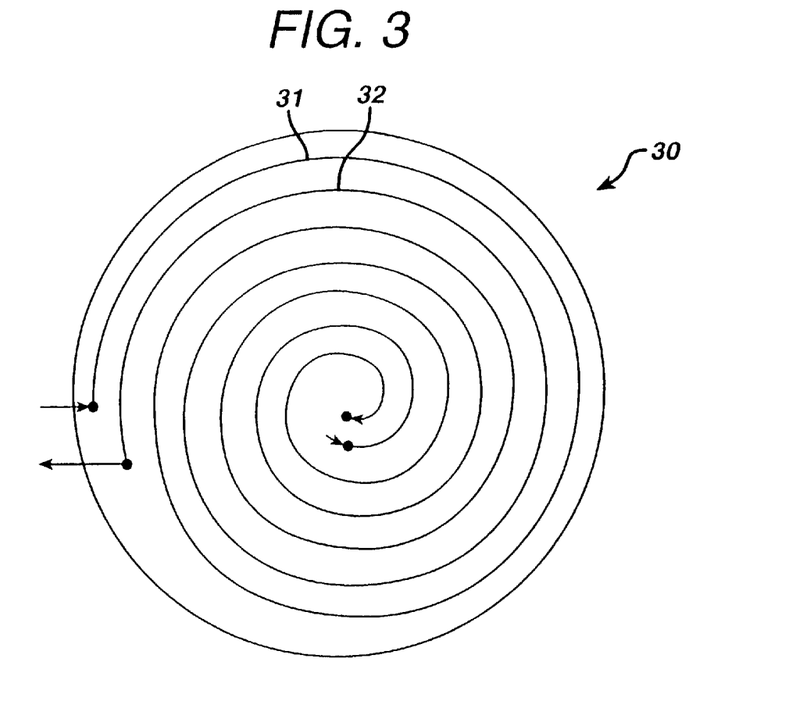
FIG. 3 depicts a schematic view of a second alternate embodiment of the reactant flow system illustrated in FIG. 2, wherein the serpentine channels are concentrically configured.

Referring to FIG. 3, an alternate embodiment reactant flow system 30 is depicted. The system 30 shows the serpentine channels 31 and 32, respectively, arranged in a concentric or a substantially circular pattern. The circular pattern can also take the form of a curvilinear configuration.

Figure 4:
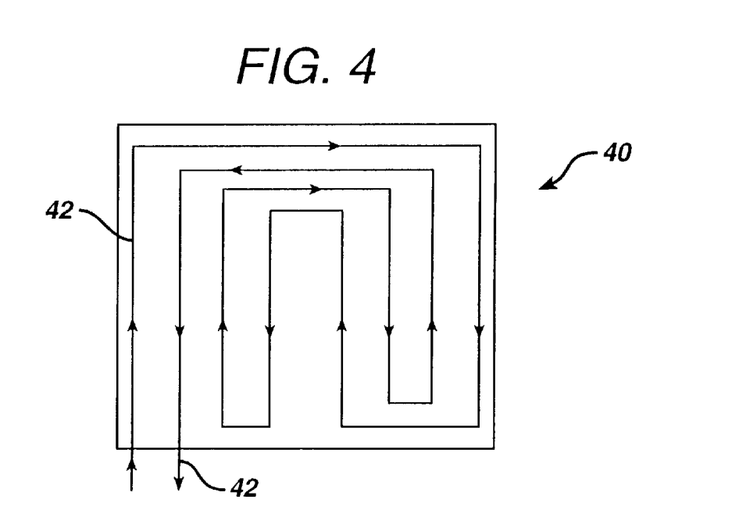
FIG. 4 illustrates a schematic view of a third alternate embodiment of the reactant flow system shown in FIG. 2, featuring a single channel pathway.

Referring to FIG. 4, a schematic is shown of a third embodiment 40 of the reactant flow system shown in FIG. 2. The system 40 comprises a single channel 42 of counter-current character, or multiple channels, each having countercurrent character, per se. This geometry has a higher pressure drop in comparison to those using countercurrent pairs of channels.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A reactant flow system for a Proton Exchange Membrane (PEM) fuel cell stack using a "water-soluble-fuel" fuel cell comprising a plurality of cells in which each cell of said PEM fuel cell stack comprises a positive cathode electrode at which reactant oxygen reduction takes place, a negative anode electrode at which reactant fuel is oxidized, a proton-exchange electrolyte membrane disposed between said positive cathode electrode and said negative anode electrode, and wherein between pairs of adjacent cells are disposed a cathode flow-field for distributing oxygen to an adjacent cathode electrode, at a side of said adjacent cathode electrode opposite a side in contact with a corresponding proton-exchange electrolyte membrane, an anode flow-field for distributing fuel to an adjacent anode electrode, at a side of said adjacent anode electrode opposite a side in contact with a corresponding proton-exchange electrolyte membrane, and a reactant separator layer disposed between said cathode flow-field and said anode flow-field, said reactant separator layer isolating said oxygen in said cathode flow-field from said fuel in said anode flow-field, said PEM fuel cell stack being configured to prevent said cathode electrode from flooding, wherein said flow-field for at least one reactant of said reactant oxygen and said reactant fuel, includes at least one pair of reactant flow channels, and further wherein at least a portion of each reactant flow channel is operatively adjacent to at least one corresponding flow channel such that a reactant flow direction in the flow channel is opposite a reactant flow direction in at least one operatively adjacent flow channel, and each reactant flow channel has a reactant inlet and a reactant outlet.

2. The reactant flow system for a PEM fuel cell stack in accordance with claim 1, wherein each reactant inlet includes means for providing substantially uniform reactant flow among all of the reactant flow channels in said fuel cell stack for a corresponding reactant.

3. The reactant flow system for a PEM fuel cell stack in accordance with claim 1, wherein said reactant flow channels are substantially parallel to each other over a substantial portion of their length, and are configured for single pass flow.

4. The reactant flow system for a PEM fuel cell stack in accordance with claim 1, wherein said reactant flow channels are substantially parallel to each other over a substantial portion of their length, and are configured for multiple pass flow.

5. The reactant flow system for a PEM fuel cell stack in accordance with claim 4, wherein each reactant inlet includes means for providing substantially uniform reactant flow among all of the reactant flow channels in said fuel cell stack for a corresponding reactant.

6. The reactant flow system for a PEM fuel cell stack in accordance with claim 4, wherein said reactant flow channels are substantially parallel to each other over a substantial portion of their length, and are configured for single pass flow.

7. The reactant flow system for a PEM fuel cell stack in accordance with claim 4, wherein said reactant flow channels are substantially parallel to each other over a substantial portion of their length, and are configured for multiple pass flow.

8. The reactant flow system for a PEM fuel cell stack in accordance with claim 4, wherein said reactant flow channels are serpentine for at least a portion of their length.

9. The reactant flow system for a PEM fuel cell stack in accordance with claim 2, wherein said means for providing substantially uniform flow further comprises a substantially uniform restriction in each of said inlets.

10. The reactant flow system for a PEM fuel cell stack in accordance with claim 9, wherein said substantially uniform restriction includes baffling.

11. The reactant flow system for a PEM fuel cell stack in accordance with claim 10, wherein said reactant flow channels are substantially parallel to each other over a substantial portion of their length, and are configured for multiple pass flow.

12. The reactant flow system for a PEM fuel cell stack in accordance with claim 10, wherein said reactant flow channels are substantially parallel to each other over a substantial portion of their length, and are configured for single pass flow.

13. The reactant flow system for a PEM fuel cell stack in accordance with claim 11, wherein said reactant flow channels are serpentine for at least a portion of their length.

14. The reactant flow system for a PEM fuel cell stack in accordance with claim 9, wherein said restriction includes a substantially uniform constriction in each of said inlets.

15. The reactant flow system for a PEM fuel cell stack in accordance with claim 14, wherein said reactant flow channels are substantially parallel to each other over a substantial portion of their length, and are configured for single pass flow.

16. The reactant flow system for a PEM fuel cell stack in accordance with claim 14, wherein said reactant flow channels are substantially parallel to each other over a substantial portion of their length, and are configured for multiple pass flow.

17. The reactant flow system for a PEM fuel cell stack in accordance with claim 16, wherein said reactant flow channels are serpentine for at least a portion of their length.

18. The reactant flow system for a PEM fuel cell stack in accordance with claim 3, wherein said reactant flow channels are substantially parallel to each other over a substantial portion of their length, and are configured for multiple pass flow.

19. The reactant flow system for a PEM fuel cell stack in accordance with claim 18, wherein said reactant flow channels are serpentine for at least a portion of their length.

20. The reactant flow system for a PEM fuel cell stack in accordance with claim 3, wherein said reactant flow channels are substantially parallel to each other over a substantial portion of their length, and are configured for single pass flow.

21. A reactant flow system for a Proton Exchange Membrane (PEM) fuel cell stack using a "water-soluble-fuel" fuel cell (comprising a plurality of cells in which each cell of said PEM fuel cell stack comprises a positive cathode electrode at which reactant oxygen reduction takes place, a negative anode electrode at which reactant fuel is oxidized, a proton-exchange electrolyte membrane disposed between said positive cathode electrode and said negative anode electrode, and wherein between pairs of adjacent cells are disposed a cathode flow-field for distributing oxygen to an adjacent cathode electrode, at a side of said adjacent cathode electrode opposite a side in contact with a corresponding proton-exchange electrolyte membrane, an anode flow-field for distributing fuel to an adjacent anode electrode, at a side of said adjacent anode electrode opposite a side in contact with a corresponding proton-exchange electrolyte membrane, and a reactant separator layer disposed between said cathode flow-field and said anode flow-field, said reactant separator layer isolating said oxygen in said cathode flow-field from said fuel in said anode flow-field, said PEM fuel cell stack being configured to prevent said cathode flow-field from flooding, wherein said flow-field for at least one reactant of said reactant oxygen and said reactant fuel, includes at least one pair of reactant flow channels, and further wherein at least a portion of each reactant flow channel is operatively adjacent to at least one corresponding flow channel such that a reactant flow direction in the flow channel is opposite a reactant flow direction in at least one operatively adjacent flow channel, and each reactant flow channel has a reactant inlet and a reactant outlet.

22. The reactant flow system for a PEM fuel cell stack in accordance with claim 21, wherein each reactant inlet includes means for providing substantially uniform reactant flow among all of the reactant flow channels in said fuel cell stack for a corresponding reactant.

23. The reactant flow system for a PEM fuel cell stack in accordance with claim 21, wherein said reactant flow channels are substantially parallel to each other over a substantial portion of their length, and are configured for single pass flow.

24. The reactant flow system for a PEM fuel cell stack in accordance with claim 21, wherein said reactant flow channels are substantially parallel to each other over a substantial portion of their length, and are configured for multiple pass flow.

25. The reactant flow system for a PEM fuel cell stack in accordance with claim 21, wherein each reactant inlet includes means for providing substantially uniform reactant flow among all of the reactant flow channels in said fuel cell stack for a corresponding reactant.

26. The reactant flow system for a PEM fuel cell stack in accordance with claim 21, wherein said reactant flow channels are substantially parallel to each other over a substantial portion of their length, and are configured for single pass flow.

27. The reactant flow system for a PEM fuel cell stack in accordance with claim 21, wherein said reactant flow channels are substantially parallel to each other over a substantial portion of their length, and are configured for multiple pass flow.

28. The reactant flow system for a PEM fuel cell stack in accordance with claim 21, wherein said reactant flow channels are serpentine for at least a portion of their length.

29. The reactant flow system for a PEM fuel cell stack in accordance with claim 21, wherein said means for providing substantially uniform flow further comprises a substantially uniform restriction in each of said inlets.

30. The reactant flow system for a PEM fuel cell stack in accordance with claim 21, wherein said substantially uniform restriction includes baffling.

31. The reactant flow system for a PEM fuel cell stack in accordance with claim 21, wherein said reactant flow channels are substantially parallel to each other over a substantial portion of their length, and are configured for multiple pass flow.

32. The reactant flow system for a PEM fuel cell stack in accordance with claim 21, wherein said reactant flow channels are substantially parallel to each other over a substantial portion of their length, and are configured for single pass flow.

33. The reactant flow system for a PEM fuel cell stack in accordance with claim 21, wherein said reactant flow channels are serpentine for at least a portion of their length.

34. The reactant flow system for a PEM fuel cell stack in accordance with claim 21, wherein said restriction includes a substantially uniform constriction in each of said inlets.

35. The reactant flow system for a PEM fuel cell stack in accordance with claim 21, wherein said reactant flow channels are substantially parallel to each other over a substantial portion of their length, and are configured for single pass flow.

36. The reactant flow system for a PEM fuel cell stack in accordance with claim 21, wherein said reactant flow channels are substantially parallel to each other over a substantial portion of their length, and are configured for multiple pass flow.

37. The reactant flow system for a PEM fuel cell stack in accordance with claim 21, wherein said reactant flow channels are serpentine for at least a portion of their length.

38. The reactant flow system for a PEM fuel cell stack in accordance with claim 21, wherein said reactant flow channels are substantially parallel to each other over a substantial portion of their length, and are configured for multiple pass flow.

39. The reactant flow system for a PEM fuel cell stack in accordance with claim 21, wherein said reactant flow channels are serpentine for at least a portion of their length.

40. The reactant flow system for a PEM fuel cell stack in accordance with claim 21, wherein said reactant flow channels are substantially parallel to each other over a substantial portion of their length, and are configured for single pass flow.

41. A reactant flow system for a Proton Exchange Membrane (PEM) fuel cell stack comprising a plurality of cells, in which each cell of said PEM fuel cell stack comprises a positive cathode electrode at which reactant oxygen reduction takes place, a negative anode electrode at which reactant fuel is oxidized, a proton-exchange electrolyte membrane disposed between said positive cathode electrode and said negative anode electrode, and wherein between pairs of adjacent cells are disposed a cathode flow-field for distributing oxygen to an adjacent cathode electrode, at a side of said adjacent cathode electrode opposite a side in contact with a corresponding proton-exchange electrolyte membrane, an anode flow-field for distributing reactant fuel to an adjacent anode electrode, at a side of said adjacent anode opposite a side in contact with a corresponding proton-exchange electrolyte membrane, and a separator layer disposed between said cathode flow-field and said anode flow-field, said separator layer isolating said reactant oxygen in said cathode flow-field from said reactant fuel in said anode flow-field, said PEM fuel cell stack being configured to prevent said cathode electrode from flooding, wherein said flow-field for at least one of said reactants of said reactant oxygen and said reactant fuel comprises at least one multi-pass flow channel, and further wherein said at least one multi-pass flow channel has at least a portion that is configured so that reactant flow is in a direction opposite to a reactant flow direction of at least one adjacent flow channel section, and each configured multi-pass flow channel having a reactant inlet and a reactant outlet.

42. The reactant flow system for a PEM fuel cell stack in accordance with claim 41, wherein each reactant inlet includes means for providing substantially uniform reactant flow among all of the reactant flow channels in said fuel cell stack for a corresponding reactant.

43. The reactant flow system for a PEM fuel cell stack in accordance with claim 41, wherein said reactant flow channels are substantially parallel to each other over a substantial portion of their length, and are configured for single pass flow.

44. The reactant flow system for a PEM fuel cell stack in accordance with claim 41, wherein said reactant flow channels are substantially parallel to each other over a substantial portion of their length, and are configured for multiple pass flow.

45. The reactant flow system for a PEM fuel cell stack in accordance with claim 41, wherein each reactant inlet includes means for providing substantially uniform reactant flow among all of the reactant flow channels in said fuel cell stack for a corresponding reactant.

46. The reactant flow system for a PEM fuel cell stack in accordance with claim 41, wherein said reactant flow channels are substantially parallel to each other over a substantial portion of their length, and are configured for single pass flow.

47. The reactant flow system for a PEM fuel cell stack in accordance with claim 41, wherein said reactant flow channels are substantially parallel to each other over a substantial portion of their length, and are configured for multiple pass flow.

48. The reactant flow system for a PEM fuel cell stack in accordance with claim 41, wherein said reactant flow channels are serpentine for at least a portion of their length.

49. The reactant flow system for a PEM fuel cell stack in accordance with claim 41, wherein said means for providing substantially uniform flow further comprises a substantially uniform restriction in each of said inlets.

50. The reactant flow system for a PEM fuel cell stack in accordance with claim 41, wherein said substantially uniform restriction includes baffling.

51. The reactant flow system for a PEM fuel cell stack in accordance with claim 41, wherein said reactant flow channels are substantially parallel to each other over a substantial portion of their length, and are configured for multiple pass flow.

52. The reactant flow system for a PEM fuel cell stack in accordance with claim 41, wherein said reactant flow channels are substantially parallel to each other over a substantial portion of their length, and are configured for single pass flow.

53. The reactant flow system for a PEM fuel cell stack in accordance with claim 41, wherein said reactant flow channels are serpentine for at least a portion of their length.

54. The reactant flow system for a PEM fuel cell stack in accordance with claim 41, wherein said restriction includes a substantially uniform constriction in each of said inlets.

55. The reactant flow system for a PEM fuel cell stack in accordance with claim 41, wherein said reactant flow channels are substantially parallel to each other over a substantial portion of their length, and are configured for single pass flow.

56. The reactant flow system for a PEM fuel cell stack in accordance with claim 41, wherein said reactant flow channels are substantially parallel to each other over a substantial portion of their length, and are configured for multiple pass flow.

57. The reactant flow system for a PEM fuel cell stack in accordance with claim 41, wherein said reactant flow channels are serpentine for at least a portion of their length.

58. The reactant flow system for a PEM fuel cell stack in accordance with claim 41, wherein said reactant flow channels are substantially parallel to each other over a substantial portion of their length, and are configured for multiple pass flow.

59. The reactant flow system for a PEM fuel cell stack in accordance with claim 41, wherein said reactant flow channels are serpentine for at least a portion of their length.

60. The reactant flow system for a PEM fuel cell stack in accordance with claim 41, wherein said reactant flow channels are substantially parallel to each other over a substantial portion of their length, and are configured for single pass flow.

61. The reactant flow system for a PEM fuel cell stack in accordance with claim 41, wherein each reactant inlet includes means for providing substantially uniform reactant flow among all of the reactant flow channels in said fuel cell stack for a corresponding reactant.

62. The reactant flow system for a PEM fuel cell stack in accordance with claim 41, wherein said reactant flow channels are serpentine for at least a portion of their length.

63. A reactant flow system for a Proton Exchange Membrane (PEM) fuel cell stack comprising a plurality of cells, in which each cell of said PEM fuel cell stack comprises a positive cathode electrode at which reactant oxygen reduction takes place, a negative anode electrode at which reactant fuel is oxidized, a proton-exchange electrolyte membrane disposed between said positive cathode electrode and said negative anode electrode, and wherein between pairs of adjacent cells are disposed a cathode flow-field for distributing oxygen to an adjacent cathode electrode, at a side of said adjacent cathode electrode opposite a side in contact with a corresponding proton-exchange electrolyte membrane, an anode flow-field for distributing reactant fuel to an adjacent anode electrode, at a side of said adjacent anode opposite a side in contact with a corresponding proton-exchange electrolyte membrane, and a separator layer disposed between said cathode flow-field and said anode flow-field, said separator layer isolating said reactant oxygen in said cathode flow-field from said reactant fuel in said anode flow-field, said PEM fuel cell stack being configured to prevent said cathode flow-field from flooding, wherein said flow-field for at least one of said reactants of said reactant oxygen and said reactant fuel comprises at least one multi-pass flow channel, and further wherein said at least one multi-pass flow channel has at least a portion that is configured so that reactant flow is in a direction opposite to a reactant flow direction of at least one adjacent flow channel section, and each configured multi-pass flow channel having a reactant inlet and a reactant outlet.

64. The reactant flow system for a PEM fuel cell stack in accordance with claim 63, wherein each reactant inlet includes means for providing substantially uniform reactant flow among all of the reactant flow channels in said fuel cell stack for a corresponding reactant.

65. The reactant flow system for a PEM fuel cell stack in accordance with claim 63, wherein said reactant flow channels are substantially parallel to each other over a substantial portion of their length, and are configured for single pass flow.

66. The reactant flow system for a PEM fuel cell stack in accordance with claim 63, wherein said reactant flow channels are substantially parallel to each other over a substantial portion of their length, and are configured for multiple pass flow.

67. The reactant flow system for a PEM fuel cell stack in accordance with claim 63, wherein each reactant inlet includes means for providing substantially uniform reactant flow among all of the reactant flow channels in said fuel cell stack for a corresponding reactant.

68. The reactant flow system for a PEM fuel cell stack in accordance with claim 63, wherein said reactant flow channels are substantially parallel to each other over a substantial portion of their length, and are configured for single pass flow.

69. The reactant flow system for a PEM fuel cell stack in accordance with claim 63, wherein said reactant flow channels are substantially parallel to each other over a substantial portion of their length, and are configured for multiple pass flow.

70. The reactant flow system for a PEM fuel cell stack in accordance with claim 63, wherein said reactant flow channels are serpentine for at least a portion of their length.

71. The reactant flow system for a PEM fuel cell stack in accordance with claim 63, wherein said means for providing substantially uniform flow further comprises a substantially uniform restriction in each of said inlets.

72. The reactant flow system for a PEM fuel cell stack in accordance with claim 63, wherein said substantially uniform restriction includes baffling.

73. The reactant flow system for a PEM fuel cell stack in accordance with claim 63, wherein said reactant flow channels are substantially parallel to each other over a substantial portion of their length, and are configured for multiple pass flow.

74. The reactant flow system for a PEM fuel cell stack in accordance with claim 63, wherein said reactant flow channels are substantially parallel to each other over a substantial portion of their length, and are configured for single pass flow.

75. The reactant flow system for a PEM fuel cell stack in accordance with claim 63, wherein said reactant flow channels are serpentine for at least a portion of their length.

76. The reactant flow system for a PEM fuel cell stack in accordance with claim 63, wherein said restriction includes a substantially uniform constriction in each of said inlets.

77. The reactant flow system for a PEM fuel cell stack in accordance with claim 63, wherein said reactant flow channels are substantially parallel to each other over a substantial portion of their length, and are configured for single pass flow.

78. The reactant flow system for a PEM fuel cell stack in accordance with claim 63, wherein said reactant flow channels are substantially parallel to each other over a substantial portion of their length, and are configured for multiple pass flow.

79. The reactant flow system for a PEM fuel cell stack in accordance with claim 63, wherein said reactant flow channels are serpentine for at least a portion of their length.

80. The reactant flow system for a PEM fuel cell stack in accordance with claim 63, wherein said reactant flow channels are substantially parallel to each other over a substantial portion of their length, and are configured for multiple pass flow.

81. The reactant flow system for a PEM fuel cell stack in accordance with claim 63, wherein said reactant flow channels are serpentine for at least a portion of their length.

82. The reactant flow system for a PEM fuel cell stack in accordance with claim 63, wherein said reactant flow channels are substantially parallel to each other over a substantial portion of their length, and are configured for single pass flow.

83. The reactant flow system for a PEM fuel cell stack in accordance with claim 63, wherein each reactant inlet includes means for providing substantially uniform reactant flow among all of the reactant flow channels in said fuel cell stack for a corresponding reactant.

84. The reactant flow system for a PEM fuel cell stack in accordance with claim 63, wherein said reactant flow channels are serpentine for at least a portion of their length.

85. The reactant flow system for a PEM fuel cell stack in accordance with claim 63, wherein each reactant inlet includes means for providing substantially uniform reactant flow among all of the reactant flow channels in said fuel cell stack for a corresponding reactant.

86. The reactant flow system for a PEM fuel cell stack in accordance with claim 63, wherein said reactant flow channels are serpentine for at least a portion of their length.

87. The reactant flow system for a PEM fuel cell stack in accordance with claim 63, wherein said means for providing substantially uniform flow further comprises a substantially uniform restriction in each of said inlets.

88. The reactant flow system for a PEM fuel cell stack in accordance with claim 63, wherein said substantially uniform restriction includes baffling.

89. The reactant flow system for a PEM fuel cell stack in accordance with claim 63, wherein said reactant flow channels are serpentine for at least a portion of their length.

90. The reactant flow system for a PEM fuel cell stack in accordance with claim 63, wherein said restriction includes a substantially uniform constriction in each of said inlets.

91. The reactant flow system for a PEM fuel cell stack in accordance with claim 63, wherein said reactant flow channels are serpentine for at least a portion of their length.

* * * * *